(12) United States Patent
Barfield, Jr. et al.

(10) Patent No.: US 9,948,898 B2
(45) Date of Patent: Apr. 17, 2018

(54) USING AERIAL IMAGING TO PROVIDE SUPPLEMENTAL INFORMATION ABOUT A LOCATION

(71) Applicant: Verizon Patent and Licensing Inc., Arlington, VA (US)

(72) Inventors: James Ronald Barfield, Jr., Atlanta, GA (US); Thomas Steven Taylor, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 812 days.

(21) Appl. No.: 14/466,582

(22) Filed: Aug. 22, 2014

(65) Prior Publication Data

US 2016/0093212 A1  Mar. 31, 2016

(51) Int. Cl.
| G08G 1/0967 | (2006.01) |
| H04N 7/18 | (2006.01) |
| G08G 1/01 | (2006.01) |
| G08G 1/017 | (2006.01) |
| G08G 1/04 | (2006.01) |
| G08G 1/052 | (2006.01) |
| G08G 1/00 | (2006.01) |

(52) U.S. Cl.
CPC ............ H04N 7/181 (2013.01); G08G 1/012 (2013.01); G08G 1/0112 (2013.01); G08G 1/0133 (2013.01); G08G 1/0141 (2013.01); G08G 1/0175 (2013.01); G08G 1/04 (2013.01); G08G 1/052 (2013.01); G08G 1/205 (2013.01); H04N 7/185 (2013.01); *B64C 2201/127* (2013.01)

(58) Field of Classification Search
CPC ...... H04N 7/185; H04N 5/181; G08G 1/0112; G08G 1/012; G08G 1/0133; G08G 1/0175; G08G 1/04; G08G 1/052
See application file for complete search history.

(56) References Cited

U.S. PATENT DOCUMENTS

| 9,282,187 | B1 * | 3/2016 | Martino | H04M 3/5116 |
| 9,426,293 | B1 * | 8/2016 | Oakes, III | H04M 3/523 |
| 2013/0311079 | A1 * | 11/2013 | Rakshit | G01C 21/20 |
| | | | | 701/400 |
| 2014/0150042 | A1 * | 5/2014 | Pacor | H04N 21/21805 |
| | | | | 725/116 |
| 2014/0320650 | A1 * | 10/2014 | Hong | H04N 7/185 |
| | | | | 348/144 |
| 2016/0247404 | A1 * | 8/2016 | Srivastava | G01C 21/20 |

* cited by examiner

*Primary Examiner* — Huy T Nguyen

(57) ABSTRACT

Aerial images, such as images from satellites or other aerial imaging devices, may be used to assist in responding to the occurrence of events (such as vehicle accidents or other emergency events) or conditions. In one implementation, an alert may be received indicating a condition or event associated with a user device. In response, an aerial image associated with the location of the user device may be requested. The alert may be responded to based on the received image. Aerial imaging may also provide views of the road ahead of a driver that terrain, topography, or darkness may otherwise impede. Image recognition may provide analysis of a hazard, condition, or occurrence at a scene that the aerial imaging system has captured and transmitted in response to a request.

20 Claims, 10 Drawing Sheets

USING AERIAL IMAGING TO PROVIDE SUPPLEMENTAL INFORMATION ABOUT A LOCATION

BACKGROUND

Aerial imaging devices may include satellites, Unmanned Aerial Vehicles (UAVs) (sometimes referred to as "drones"), blimps, or other devices that are designed to stay above the earth for relatively long periods of time and capture images. The captured images may be wirelessly transmitted, in real-time or near real-time, to terrestrial locations for analysis. Aerial images have a number of applications in fields, such as meteorology, oceanography, fishing, agriculture, biodiversity conservation, forestry, landscaping, geology, cartography, regional planning, and warfare.

DETAILED DESCRIPTION OF PREFERRED EMBODIMENTS

The following detailed description refers to the accompanying drawings. The same reference numbers in different drawings may identify the same or similar elements.

Techniques described herein relate to the use of aerial images, such as images from satellites or other aerial imaging devices, to assist in responding to the occurrence of events (such as vehicle accidents or other emergency events), or in the detection or verification of events or conditions. Alerts may be automatically generated, such as by vehicle telematics devices or mobile devices of users, to indicate the potential occurrence of an event or condition. The aerial images may be used to verify the occurrence of the event or condition and/or to assist in the response to the event or condition.

Figure 1:
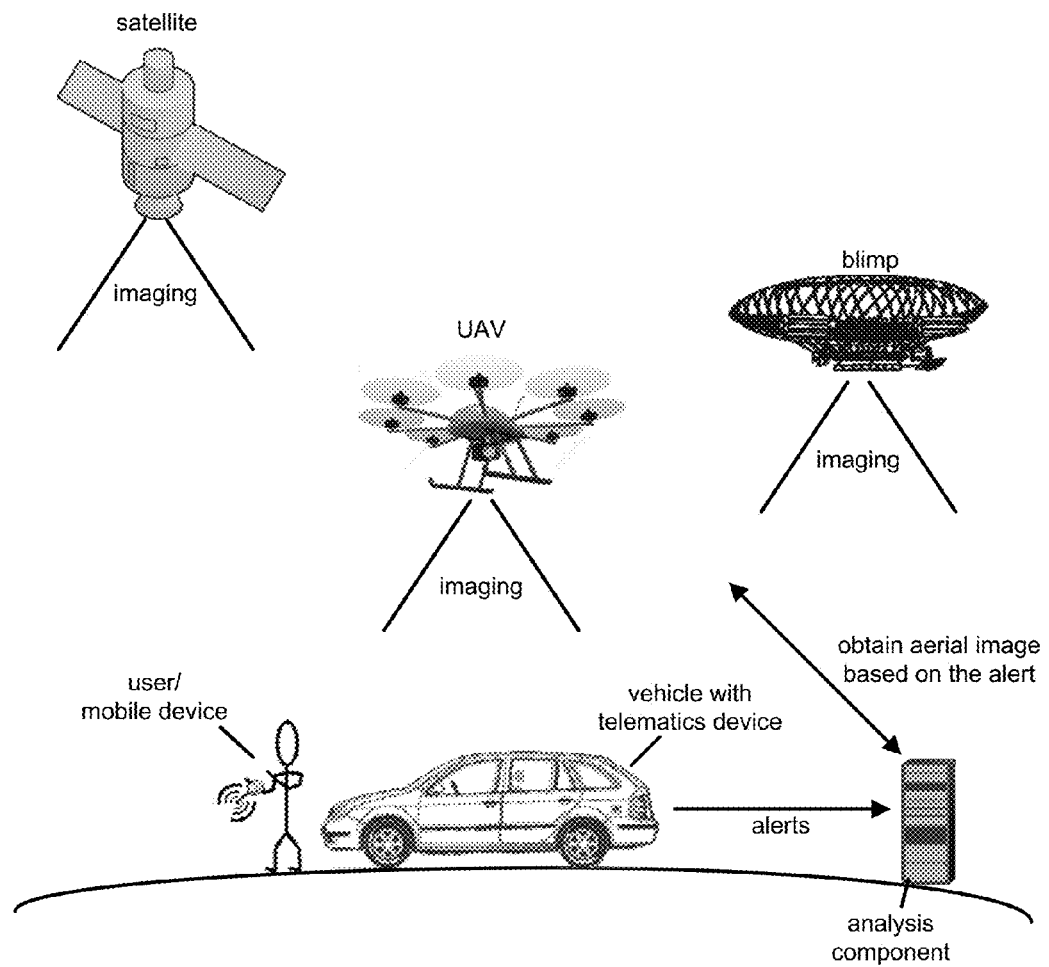
FIG. 1 is a diagram illustrating an example of an overview of concepts described herein.

FIG. 1 is a diagram illustrating an example of an overview of concepts described herein. Various aerial imaging devices are illustrated in FIG. 1. The term "aerial imaging device", as used herein, may refer to a device that is designed to stay aloft for a relatively long period of time. Examples of aerial imaging devices, as illustrated in FIG. 1, include satellites, UAVs, and blimps. The aerial imaging devices may have cameras designed to capture images of the surface of the earth and wireless communication systems to transmit the images to terrestrial processing or storage facilities. The geographical area for an image captured by an aerial imaging device may be selected via a command that is wirelessly transmitted to the aerial imaging device.

The images captured by the aerial imaging devices may be captured in response to alerts generated by terrestrial devices. For example, a vehicle telematics device, associated with a vehicle, may detect a possible collision or other event. The vehicle telematics device may output an alert corresponding to the detected event, such as by transmitting the alert, via a cellular wireless network, to an analysis component (e.g., a server device). The analysis component may identify an available aerial imaging device and may direct the aerial imaging device to take an image of the location corresponding to the alert. As another example, a user associated with a mobile device, such as a smartphone, may manually generate an alert, such as by calling an emergency response number. In response, the aerial imaging device may be directed to take an image of the location associated with the user.

The obtained aerial image may be used to process or respond to the alert. For example, for an alert that is generated in response to a vehicle collision, the aerial image may be provided to an emergency operator to assist the operator in evaluating the seriousness of the situation. As another example, an alert may be automatically generated in response to the detection of specific road conditions, such as the detection of potholes or excessive traffic congestion. In this situation, the aerial images may be used to verify or provide further information relating to the severity of the specific road conditions.

Figure 2:
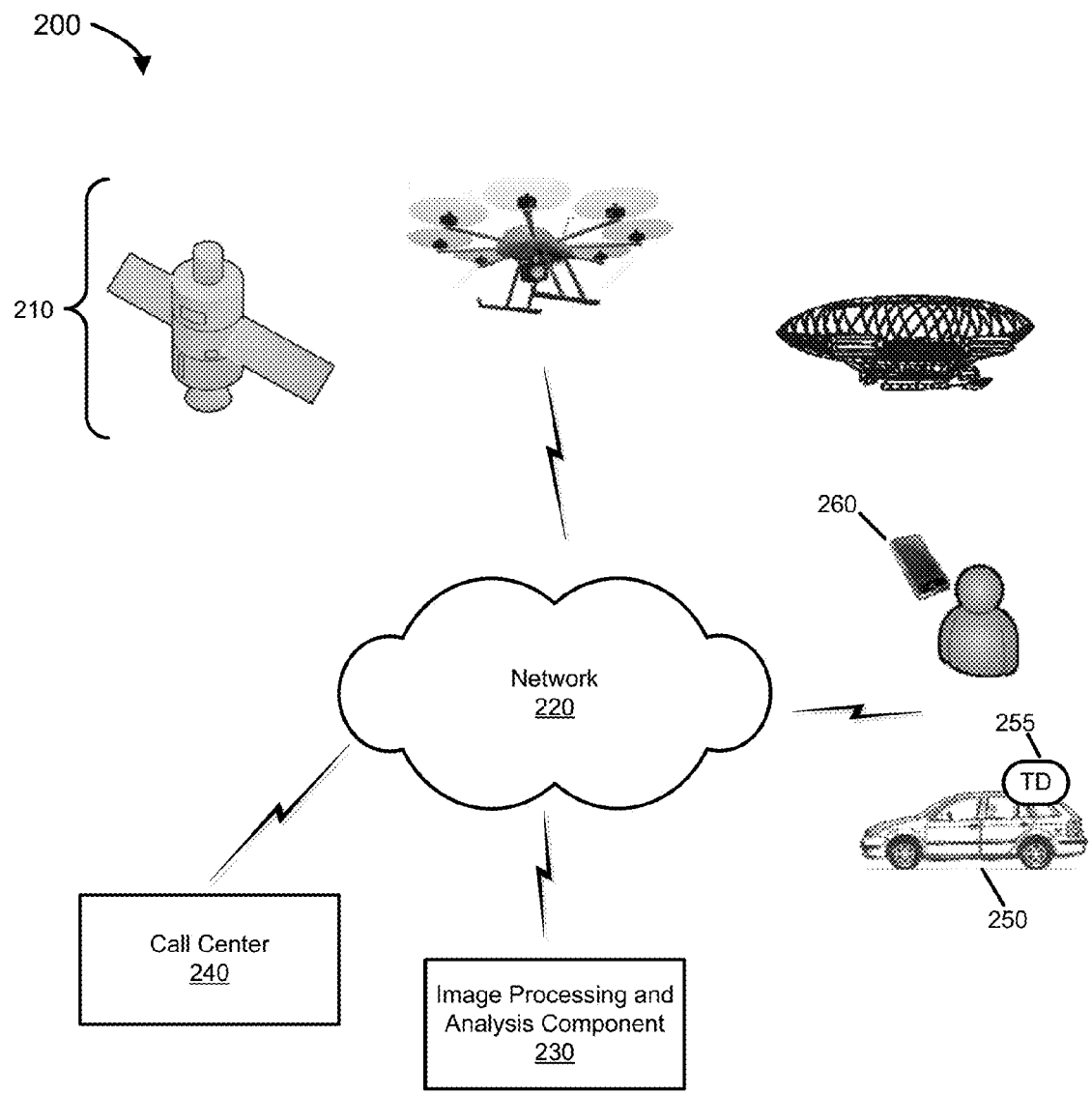
FIG. 2 is a diagram illustrating an example environment in which systems and/or methods described herein may be implemented.

FIG. 2 is a diagram illustrating an example environment 200 in which systems and/or methods described herein may be implemented. Environment 200 illustrates an environment in which aerial imaging devices provide images, of particular locations/areas, to assist in the detection of the occurrence of certain events and/or to assist in the determination of an appropriate response to events. As shown, environment 200 may include aerial imaging devices 210, network 220, image processing and analysis component 230, call center 240, vehicle 250, and mobile device 260.

Aerial imaging devices 210 may include one or more devices that are designed to take aerial images and transmit the images to one or more terrestrial processing components. For example, as illustrated, aerial imaging devices 210 may include satellites, UAVs, balloons/blimps, and/or helicopters/planes. Aerial imaging device 210 may also include terrestrial overhead cameras (e.g., traffic cameras) or other imaging devices. Aerial imaging devices 210 may include cameras that can be controllably focused on different terrestrial locations. For example, aerial imaging device 210, responsive to a command (e.g., a command that is wirelessly received from image processing analysis component 230), may capture an image of a particular location and output the image. In some implementations, aerial imaging devices 210 may include sensing elements other than cameras, such as infrared sensors, heat sensors, synthetic aperture radar, lidar, radar, and/or magnetic field sensors. Data from these sensors may also be transmitted to the terrestrial processing components.

Network 220 may represent a wireless network (e.g., a wireless cellular network) and/or a wired network through which aerial imaging devices 210, image processing analysis component 230, call center 240, vehicle 250, and mobile device 260 may communicate. Network 220 may include a wide area network ("WAN"), a metropolitan area network ("MAN"), the Internet, a fiber optic-based network, and/or a combination of these or other types of networks. In one implementation, network 240 may include a wireless network that is implemented based on the Long Term Evolution ("LTE") standard. In other implementations, network 220 may include a wireless network implemented based on other standards. Network 220 may include directional wireless communication devices, such as directional antennas that are used to implement bidirectional communications with aerial imaging devices 210.

Image processing and analysis component 230 may include one or more computing devices that receive and/or process images from aerial imaging devices 210. Image processing and analysis component 230 may, for example, store and output images (e.g., to emergency response personnel), received from aerial imaging devices 210; analyze receive images to automatically detect conditions or events in the images; output alerts relating to the detected conditions; and/or perform other automatic or semi-automatic (e.g., with the assistance of a technician) functions relating to images received from aerial imaging devices 210.

Call center 240 may include one or more devices or systems (e.g., telephones, computers, displays, etc.) designed to provide emergency response services or other services that are provided in conjunction with an operator. For example, call center 240 may be associated with operators trained to handle telephone calls from users that may require assistance. The operators may speak to the user that potentially requires assistance and/or may view device-specific data, user-specific data, or situation specific data (e.g., an image of the location). Depending on the situation, the operator may take actions to assist the user, such as by calling for an ambulance, contacting a designated emergency contact for the user, or assisting the user in some other way.

Vehicle 250 may represent a vehicle equipped with a telematics device ("TD") 255. Telematics device 255 may be a device that is associated with vehicle 250 and that provides information relating to location of the vehicle, movement of the vehicle, operational status of the vehicle, diagnostic information of the vehicle, and/or behavior information of the vehicle. Some vehicle telematics devices are designed to be inserted into the On-Board Diagnostics (OBD) port of a vehicle, which may allow the telematics device to obtain diagnostic information and/or power from the vehicle. Information obtained by the telematics device may be wirelessly transmitted, such as via a cellular network (e.g., via network 220), to a remote location (e.g., to image processing and analysis component 230) for analysis and/or to allow for actions to be taken (e.g., dispatch emergency personnel).

Mobile device 260 may include any computation and communication device, such as a wireless mobile communication device that is capable of communicating, via network 220, with other devices. For example, mobile device 260 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smartphone; a laptop computer; a tablet computer; a camera; a personal gaming system; a smart watch (e.g., watches that can perform task and display information to a user by connecting to a local or remote server); a smart pair of glasses (e.g., glasses capable of connecting to local or remote servers containing a way to display information to a user), or another type of mobile computation and communication device.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3:
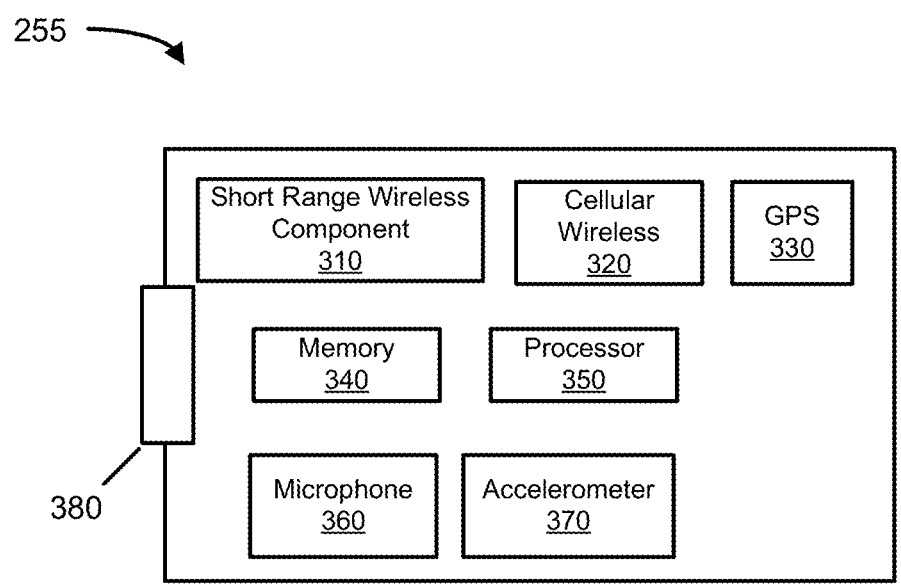
FIG. 3 is a block diagram conceptually illustrating an example of components that may be included within a telematics device.

FIG. 3 is a block diagram conceptually illustrating an example of components that may be included within one of telematics device 255. In some implementations, telematics device 255 may be configured to couple to an OBD-II port of a vehicle and may obtain electrical power from the port. In this situation, in addition to obtaining data from sensors implemented within telematics device 255, telematics device 255 may obtain information from the OBD system of the vehicle. In other implementations, telematics device 255 may be implemented independently of the OBD system of the vehicle.

As illustrated, telematics device 255 may include short range wireless component 310, cellular wireless component 320, Global Positioning System (GPS) component 330, memory 340, processor 350, microphone 360, accelerometer 370, and connector 380 (e.g., OBD-II diagnostics connector).

Short range wireless component 310 may include an antenna, radio transceiver circuitry, and/or other circuitry to implement a short range wireless connection. A short range wireless connection may include a wireless connection formed over an unlicensed frequency band (i.e., a frequency band that may be legally used without requiring a license from an applicable government entity). Examples of possible short range wireless networking technologies, which may be implemented by short range wireless component 310, include Wi-Fi (i.e., IEEE 802.11 based technologies), Bluetooth®, or other wireless technologies.

Cellular wireless component 320 may include an antenna, radio transceiver circuitry, and/or other circuitry to implement a radio interface with a wireless cellular network, such as network 220. A wireless cellular connection may include a wireless connection formed over a licensed frequency band (i.e., a frequency band that may be licensed by a telecommunications provider to provide cellular wireless service to customers). Cellular wireless connections may generally include longer connection ranges and wider connection areas than short range wireless connections.

GPS component 330 may include circuitry or other logic to receive and process GPS signals. GPS component 330 may obtain, or assist in obtaining, a geographic location of telematics device 255. In other implementations, other satellite positioning systems may alternatively or additionally be used. Other location determination techniques, such as those based on determining the location of nearby cellular base stations, may alternatively or additionally be used.

Memory 340 may include any type of dynamic storage device that may store information and instructions for execution by processor 350, and/or any type of non-volatile storage device that may store information for use by processor 350. Processor 350 may include a processor, microprocessor, or processing logic that may interpret and execute instructions, such as instructions stored in memory 340. Telematics device 255 may perform certain operations that implement processes relating to obtaining and transmitting data (such as location data determined by GPS component 330, audio data sensed by microphone 360, acceleration data sensed by accelerometer 370, and/or data sensed by other sensors) to an external device, such as image processing and analysis component 230. Telematics device 255 may perform these operations in response to processor 350 executing software instructions stored in a computer-readable medium, such as memory 340. A computer-readable medium may be defined as a non-transitory memory device.

Microphone 360 may include an electroacoustic transducer to sense sound. Accelerometer 370 may include a device to measure acceleration. Accelerometer 370 may measure proper acceleration and may output the measured acceleration as three values, corresponding to the measured acceleration values along orthogonal axes of the accelerometer. In various implementations, telematics device 255 may include additional sensors, such as a gyroscope, a barometer (for detecting elevation), a compass, and/or other sensors.

Connector 380 may be a physical connector designed to be plugged into an OBD port (using an OBD-II standardized interface) of a vehicle. In other implementations, in which telematics device 255 is not an OBD device, connector 380 may include a physical clip or other device designed to physically secure telematics device 255 to vehicle 250.

Although not explicitly shown in FIG. 3, short range wireless component 310, cellular wireless component 320, GPS component 330, memory 340, processor 350, microphone 360, and accelerometer 370 may be connected to one another through one or more busses. Further, telematics device 255 may contain fewer components, different components, differently arranged components, or additional components than those depicted. Alternatively, or additionally, one or more components of telematics device 255 may perform one or more other tasks described as being performed by one or more other components.

Figure 4:
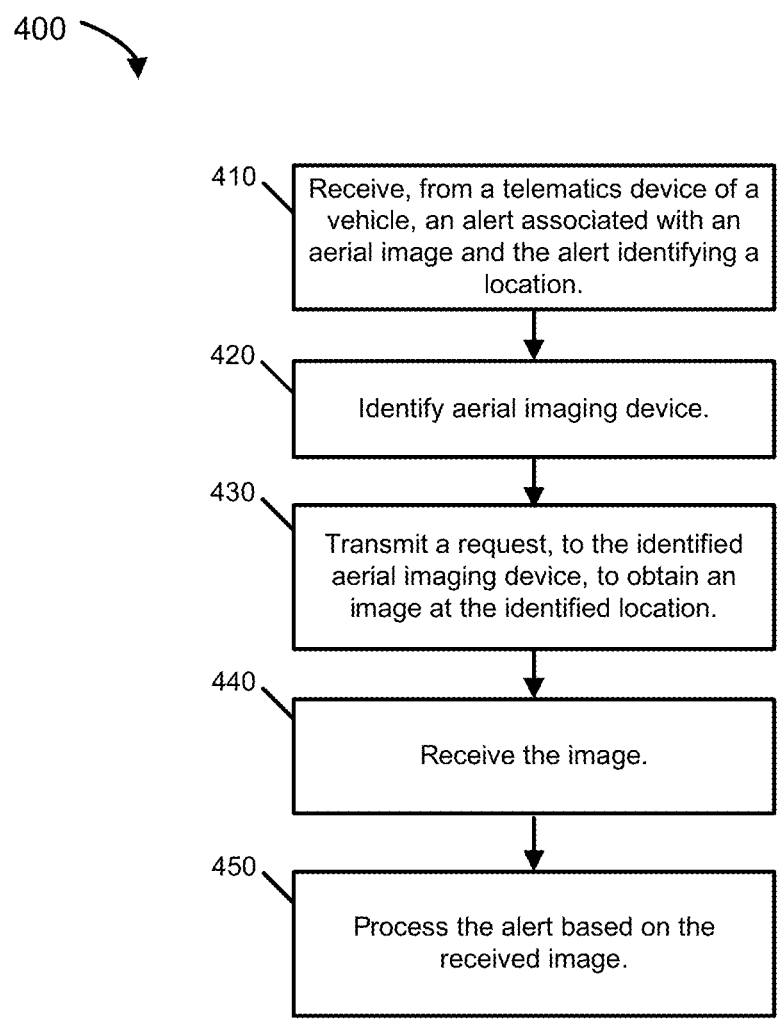
FIG. 4 is a flowchart illustrating an example process relating to the use of aerial images to provide supplemental information about a location.

FIG. 4 is a flowchart illustrating an example process 400 relating to the use of aerial images to provide supplemental information about a location. Process 400 may be implemented by, for example, image processing and analysis component 230. In other implementations, process 400 may be implemented by any computing device or set of computing devices capable of receiving telematics data from telematics device 255 and communicating with aerial imaging device 210.

Process 400 may include receiving, from a telematics device of the vehicle, an alert associated with a request for an aerial image (block 410). The alert may additionally identify a location (block 410). The telematics device may automatically generate the alert based on data sensed by telematics device 255 (e.g., acceleration data from accelerometer 370, audio data from microphone 360, and/or other sensed data) and/or data received by telematics device 255, such as data received via the OBD port of a vehicle. The alert may include the location of vehicle 250 and information identifying the type of alert.

Many different types of alerts may be generated and transmitted by telematics device 255. In one implementation, the type of alert may be an alert relating to the detection of a vehicle collision of vehicle 250. For example, one or more supervised or unsupervised machine learning techniques may be used to generate model(s) that may be implemented by telematics device 255 and that may output an indication when vehicle 250 is involved in a collision. The model(s) may be trained on (i.e., the model may be derived from) and receive input data such as: acceleration data (e.g., sudden deceleration may indicate a collision), audio data (e.g., crashing noises may indicate a collision), gyroscopic data (e.g., rapid spinning may indicate a collision), and/or OBD diagnostic information (e.g., the sudden failure of a large number of vehicle systems may indicate a collision).

Alerts relating to other events may additionally or alternatively be generated by telematics device 255. For example, model(s) may be trained to identify road potholes (e.g., based on acceleration data). Telematics device 255 may transmit an alert, to image processing and analysis component 230, when a potential pothole is detected. As another example, model(s) may be trained to identify potential traffic congestion (e.g., based on GPS data indicting vehicle 250 is moving too slowly for a particular road). Telematics device 255 may transmit an alert, to image processing and analysis component 230, when potential traffic congestion is detected. As another example, telematics device 255 may transmit an alert when diagnostic information, received by telematics device 255 through the OBD of vehicle 250, indicates that vehicle 250 is not working (e.g., "broken down").

Process 400 may further include identifying an aerial imaging device (block 420). Aerial imaging device 210 may be identified based on the location information included in the alert, such that the identified aerial imaging device is in a position that allows the aerial imaging device to capture an image of vehicle 250.

Process 400 may further include transmitting a request, to the identified aerial imaging device, to obtain an image at the identified location (block 430). In response, the identified aerial imaging device 210 may obtain the requested image (or images) and transmit the image back to image processing and analysis component 230. The requested image may thus be received by image processing and analysis component 230 (block 440). In one implementation, the request to obtain the image may include an indication of a required or desired resolution of an image. For example, an image that is to be used to provide visual information relating to the severity of a vehicle resolution may require less resolution than an image that is be to be used to determine the presence of potholes, standing water, debris, or other hazards, in a road. The request may be sent by a user device, for example mobile device 260, or a device made as part of the vehicle. The request may be sent in response to a being stopped by law enforcement to record the interaction with the law enforcement personnel and the user. The user may also transmit a request when driving in a deserted area at night time, for example. In such a scenario, the imaging system may transmit light-based imaging, infrared imaging, or similar, of the area surrounding of the vehicle, especially the road ahead and general vicinity, to alert of a potential hazard, which may include wild animals or a vehicle in the road ahead, either approaching or in the lane directly ahead, which the driver may not be able to see with their eyes. The request may typically be based on the location of the vehicle, and if the vehicle is moving, vehicle performance data may be used to customize the type and area of image sent in response to the request. For example, the faster the vehicle is traveling, the wider a view the aerial imaging device/system may capture and send in response to the request. In addition, the general driving behavior (i.e., aggressiveness) of the driver as determined using the telematics device and related applications and systems, during the preceding road segments, either during the current trip, or during multiple previous trips, may be used to manage the resolution and view sent from the aerial imaging system.

The image may be received in real-time or near real-time, where, as used herein, "real-time" may refer to receiving the image quickly enough so that the image is useful in responding to the event for which the image is requested. For a vehicle collision, for example, real-time may be on the order of minutes (e.g., fast enough to be able to provide the image to an emergency response operator that is deciding how to respond to the collision). For the example discussed above with respect to detecting potholes, however, obtaining the image quickly may not be important in fixing potholes (e.g., the image may be provided to road repair crews at a later date or used to assess, at a later date, the severity/size of the pothole). In this situation, there may be a significant delay between the request for the image and the transmitting of the image by aerial imaging device 210 (e.g., aerial imaging device 210 may queue the taking of the image until optimal weather conditions are detected and/or until aerial imaging device 210 does not have any higher priority imaging tasks to perform). In some implementations, image processing and analysis component 230 and/or aerial imaging devices 210 may rank or prioritize received image requests based on the time sensitivity of the images (e.g., image requests relating to vehicle collisions may be generally be prioritized ahead of image requests that are used to observe road conditions).

Process 400 may further include processing the alert based on the received image (block 450). In other words, the received image may be used when responding to the alert. As previously mentioned, for an image of a vehicle collision, processing the alert may include outputting the image to a call center operator or to another emergency response operator. The image may thus be used by the call center operator to, for example, assess the severity of the vehicle collision and/or in determining an appropriate response to the vehicle collision. As another example, for a vehicle collision, the image may be used to automatically assess the severity of the collision (e.g., determine the number of vehicles involved in the collision, the color of the vehicles, the location of the colliding vehicles in relation to traffic patterns in the road) and may be automatically (e.g., without first forwarding to a call center operator) to the police, emergence response personnel (e.g., an ambulance team), or to an insurance entity. In the example of detecting potholes, the image may be analyzed, either using automatic or manually performed image analysis, to locate potholes in the roads and/or to grade the size of the potholes. This analysis may be used, for example, to prioritize an order in which the potholes are fixed.

Figure 5:
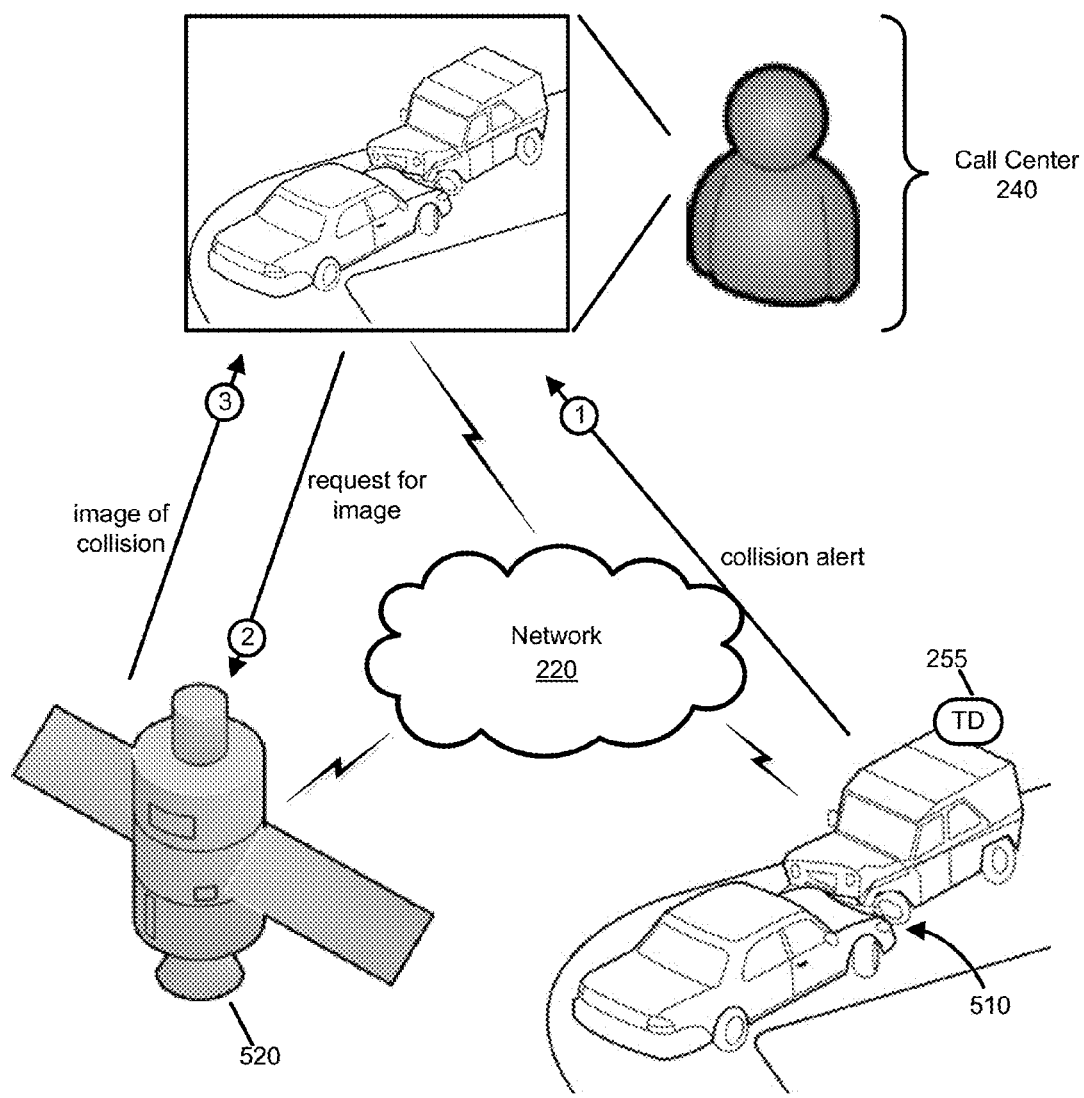
FIG. 5 is a diagram illustrating an example of one implementation consistent with the process illustrated in FIG. 4.

FIG. 5 is a diagram illustrating an example of one implementation consistent with process 400. The example of FIG. 5 may generally relate to the detection and reporting of a collision by a telematics device.

As shown in FIG. 5, assume a vehicle collision 510 occurs between two vehicles. One of the vehicles may include telematics device 255. Telematics device 255 may automatically detect the collision, such as by using a previously trained model to detect collisions based on sensed acceleration and audio data (and/or other data). The telematics device may transmit an alert, indicating the potential collision and including the location of the vehicle, to image processing and analysis component 230 or to call center 240 (at 1, "collision alert"). As another example of the generation of the alert, a user that manually calls the call center (e.g., by placing a 911 call) may trigger the alert. Based on the location of the vehicle, satellite 520, which may be capable of acquiring an image of the collision, may be identified and a request for an image of the location may be transmitted to satellite 520 (at 2, "request for image"). The satellite may take an image of the collision location and output the image to the call center (at 3, "image of collision").

A call center operator, when handling the emergency call, may view the image of the collision. The image may allow the call center operator to more effectively respond to the call. For example, the image may allow the call center operator to judge the severity of the accident and/or estimate the number of wounded. In this manner, images from an aerial image device, such as satellite 520, may be obtained in real-time or near real-time and used to assist in processing a collision or other event associated with the image. As previously mentioned, instead of providing the image (and/or a report relating to the images) to a call center operator, the image may be provided directly to the police, emergence response personnel (e.g., an ambulance team), or other entities, In one implementation, image processing and analysis component 230 may automatically process the received image to provide additional information to the call center operator or to another entity. For example, image processing and analysis component 230 may determine the make/model of the vehicle (e.g., the make/model may be received from telematics device 255). Image processing and analysis component 230 may use the make/model information to determine what vehicle 250 should look like (i.e., if not involved in a collision) and may compare what vehicle 250 should look like to the image to obtain an automatic estimate of the severity of the collision. This information may be provided to the call center operator.

Figure 6:
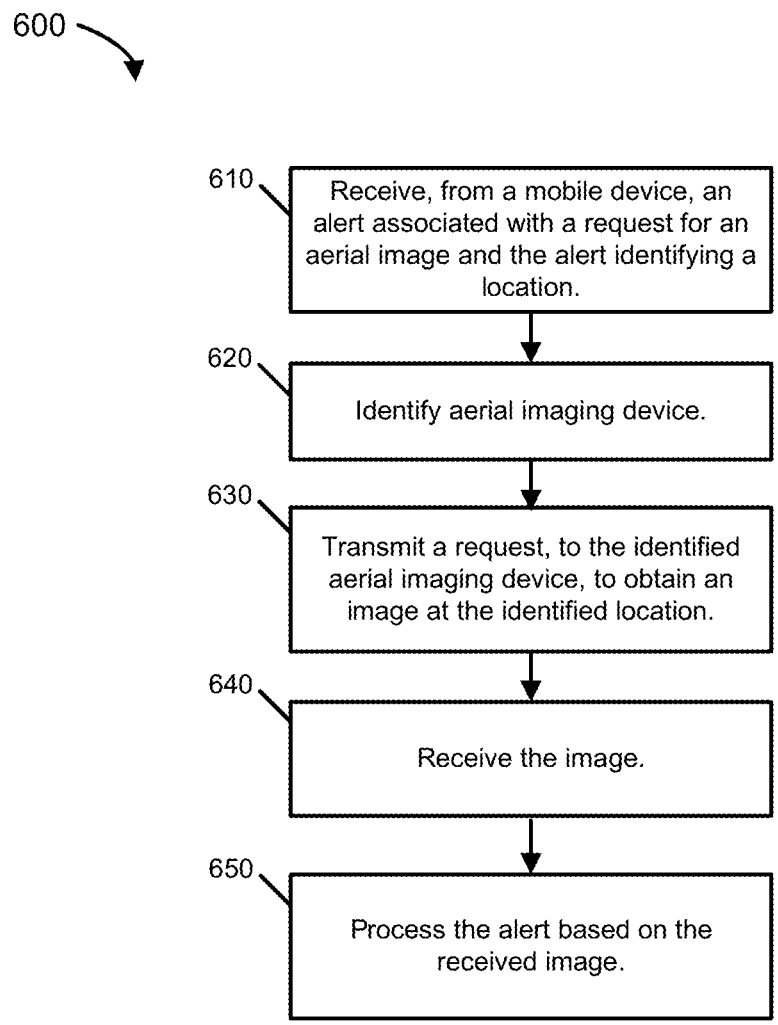
FIG. 6 is a flowchart illustrating another example process relating to the use of aerial images to provide supplemental information about a location.

FIG. 6 is a flowchart illustrating another example process 600 relating to the use of aerial images to provide supplemental information about a location. In the example of process 600, the capture of the aerial images may be triggered by an alert received from mobile device 260. Process 600 may be implemented by, for example, image processing and analysis component 230. In other implementations, process 600 may be implemented by any computing device or set of computing devices capable of communicating with mobile device 260 and communicating with aerial imaging device 210.

Process 600 may include receiving, from a mobile device of a user, an alert associated with a request for an aerial image (block 610). The alert may also identify a location (block 610). For example, the alert may identify the current location of mobile device 260 and identify the type of alert. Mobile device 260 may automatically generate the alert based on data sensed by mobile device 260 and/or based on a specific indication or action by a user of mobile device 260.

Many different types of alerts may be generated and transmitted by mobile device 260. In one implementation, the type of alert may be an alert relating to the detection of a vehicle collision of vehicle 250. For example, a user of mobile device 260 may call an emergency number (e.g., a 911 number) or may specifically indicate, such as through an application associated with mobile device 260, that there is an emergency (e.g., a vehicle collision, a personal health emergency, a vehicle break down, sensing the sound of a gun being fired, sensing fire, a vehicle out of gas emergency, etc.). As another example, a user of mobile device 260 may specifically indicate the occurrence of an external emergency, such as a forest fire. Aerial images of the forest fire may be automatically acquired and used to analyze the extent of the forest fire. As another example, mobile device 260 may be configured to automatically generate an alert in response to detecting, for example, a specific level of traffic congestion (e.g., using GPS/location readings) when the user is driving a vehicle. Aerial images of the congestion may be automatically acquired and used to analyze the traffic congestion. Automatic analysis of traffic congestion and data from mobile device 260 (and potentially also from telematics device 255) may be useful in accurately determining insurance rates. As yet another example of a type of alert, mobile device 260 may include an "agriculture" application through which a farmer may indicate that aerial images of farming fields are desired. The farmer, or another entity, may be provided with the aerial images to allow the farmer to assess crop growth. As yet another example of a type of alert, mobile device 260 (or another device, such as a personal monitoring device), may generate an alert based on the automatic detection that a user has fallen, is having a diabetic incident, or is otherwise in distress.

Process 600 may further include identifying an aerial imaging device (block 620). Aerial imaging device 210 may be identified based on the location information included in the alert, such that the identified aerial imaging device is in a position that allows the aerial imaging device to capture an image of the location.

Process 600 may further include transmitting a request, to the identified aerial imaging device, to obtain an image at the identified location (block 630). In response, the identified aerial imaging device 210 may obtain the requested image (or images) and transmit the image back to image processing and analysis component 230. The requested image may thus be received (block 640).

Process 600 may further include processing the alert based on the received image (block 650). The received image may thus be used to respond to the alert. Based on the alert, the received image may, for example, be automatically processed by image processing and analysis component 230, provided to a user of mobile device 260, provided to call center 240, or provided to and/or analyzed by another entity. For example, in one implementation relating to the providing of emergency services, the image may be used, by a call center operator, in assessing the situation and in providing precise instructions relating to how to reach the user of mobile device 260.

Figure 7:
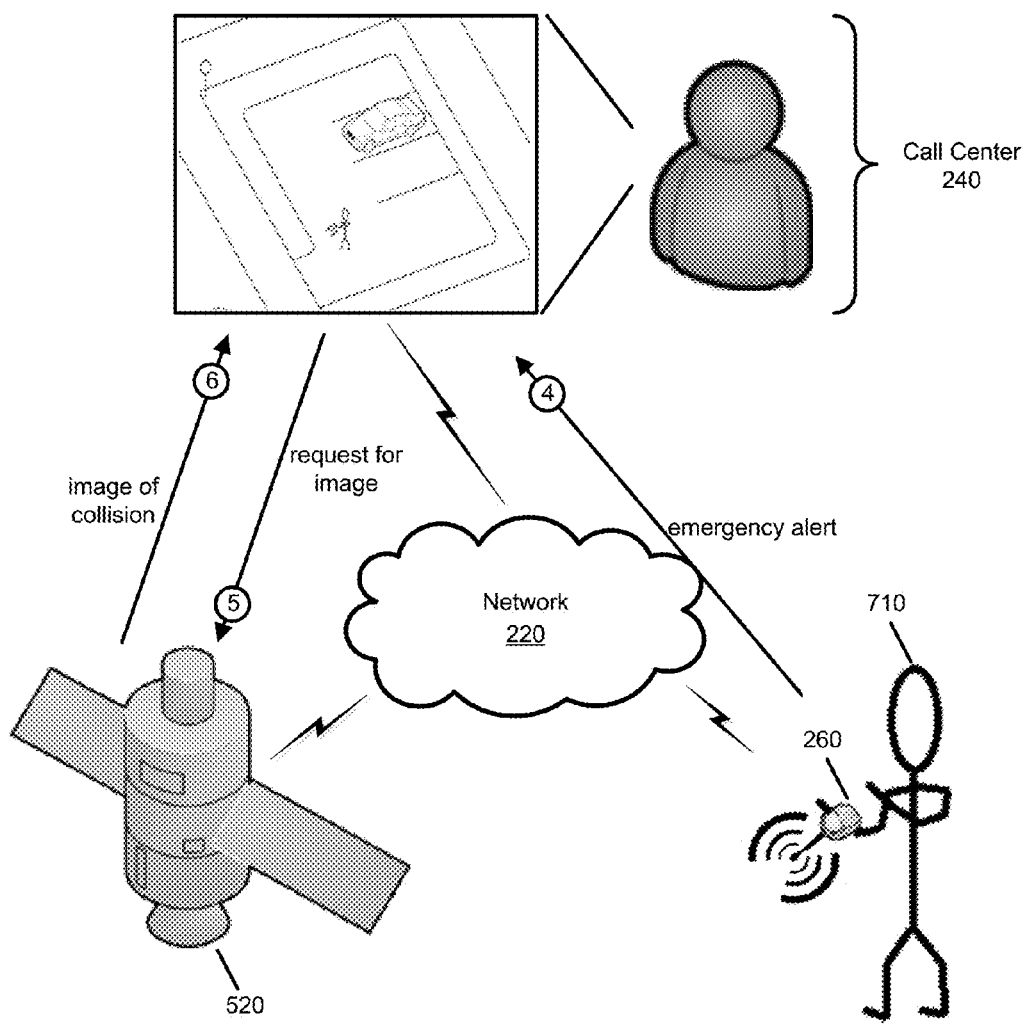
FIG. 7 is a diagram illustrating an example of one implementation consistent with the process illustrated in FIG. 6.

FIG. 7 is a diagram illustrating an example of one implementation consistent with process 600. The example of FIG. 7 may generally relate to the detection and reporting of an event by a user of mobile device 260. In this example, assume that the user experiences a health related emergency (e.g., the user is feeling dizzy, nauseous, etc.).

As shown in FIG. 7, a user 710, that is experiencing a health emergency, may use mobile device 260 to generate an alert indicating that the user needs assistance (at 4, "emergency alert"). For example, the alert may correspond to a 911 call or an alert input via an emergency response application. The alert may include the location of the user. The alert may be transmitted to call center 240. The alert may be generated in response to the user dialing an emergency response number, selecting that the user needs assistance through an application installed on mobile device 260, or based on a signal received from an external medical device. With respect to an alert generated by an external medical device, the external medical device may include a heart monitor, blood pressure monitor, or some other device that measures metrics relating to medical or body health. The external medical device may communicate with mobile device 260, such as being paired through a short range wireless connection (e.g., Bluetooth®), to signal that an alert should be generated. Alternatively, the external medical device may directly transmit the alert to call center 240.

Based on the location indicated in the alert, satellite 520 may be identified and a request for an image of the location may be transmitted to satellite 520 (at 5, "request for image"). The satellite may take an image of the location, corresponding to the alert, and output the image to a call center (at 6, "image of collision").

A call center operator may view the image of the location. The call center operator may use the image to potentially enhance emergency services provided for user 710. For example, the call center operator may, using the image, provide precise directions to first responders (e.g., to an ambulance team). In this example, for instance, the call center operator may provide directions, to the first responders, such as "the distressed person is in a parking lot approximately 10 feet from a blue car."

Figure 8:
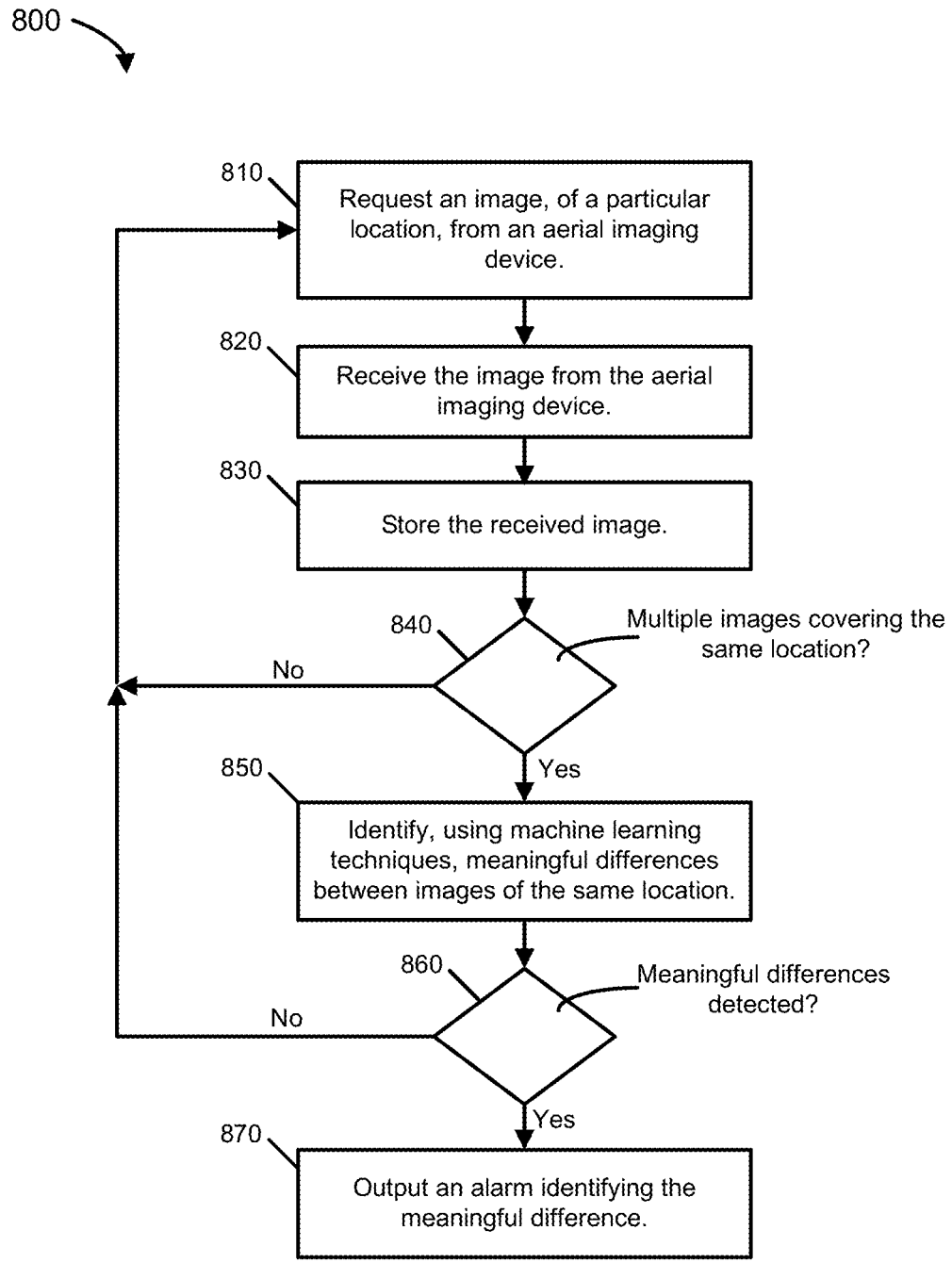
FIG. 8 is a flowchart illustrating an example process relating to the use of multiple aerial images to monitor particular locations for meaningful changes.

FIG. 8 is a flowchart illustrating an example process 800 relating to the use of multiple aerial images to monitor particular locations for meaningful changes. Process 800 may be implemented by, for example, image processing and analysis component 230.

Process 800 may include requesting an image, of a particular location, from an aerial imaging device (block 810). For example, image processing and analysis component 230 may transmit the request to an aerial imaging device 210. The location, corresponding to the request, may be one of a number of locations that are determined to be locations that are to be monitored. In one implementation, the locations that are to be monitored may be locations that are manually selected by a technician or other user. For example, the locations may correspond to places that are to be monitored for error or breakage conditions. For instance, bridges, sections of road, dams, and train tracks may be monitored for structural changes; agriculture land may be monitored for crop quality; livestock grazing fields may be monitored for quantity or health of the livestock; and forest land may be monitored for forest fires.

Process 800 may further include receiving the requested image from the aerial image device (block 820) and storing the image (block 830). For example, image processing and analysis component 230 may sequentially request images of various locations and store the received images for analysis.

Process 800 may further include determining whether multiple images cover the same location (block 840). For example, based on the locations corresponding to the most recently received and stored image, image processing and analysis component 230 may determine whether the latest image of the corresponding location is covered by a previously stored image.

When multiple image do not cover the same location (block 840—No), this may indicate that the latest image is the first image for a particular location. Image processing and analysis component 230 may request another image (block 810).

When multiple image do not cover the same location (block 840—Yes), process 800 may include identifying, using machine learning techniques, meaningful differences between the images of the same location (block 850). "Meaningful differences," as used herein, may refer to differences that may indicate an error condition or other condition that warrants the outputting of an alarm. For example, for an image that includes a bridge, meaningful differences between images of the bridge may be differences that indicate possible structural damage to the bridge that should be further reviewed by an engineer. For an image that includes a section of train track, changes between the images of the track that indicate a break in the track may be classified as a meaningful difference. In one implementation, the machine learning techniques may be applied for each location. For example, supervised or unsupervised machine learning techniques (e.g., decision tree classifiers, neural networks, regression, k-means algorithms, etc.) may be applied to generate a classification model to determine when there is a structural change in a particular bridge. Another classification model may be generated to determine when changes in a section of train track indicate a break in the track. In some implementations, the classification models may receive inputs other than and/or in addition to images. For example, aerial imaging device 210 may include thermal sensors. The data generated by the thermal sensors may be used as inputs to a classification model when detecting forest fires.

When meaningful differences are detected (block 860—Yes), an alarm may be output to identify the meaningful difference (block 870). The alarm may be output, for example, to a technician, engineer, or other entity responsible for the particular location or structure. Different locations/structures may correspond to different alarms and/or different alarm destinations. For example, in response to a determination that a particular bridge has incurred a structural change, the alarm may be output to an entity responsible for maintaining the bridge.

A number of techniques were discussed above for using aerial imaging data to provide information about a location in order to provide emergency services and/or to provide other services relating to the location or relating to a user or device associated with the location. In other implementations, the aerial imaging data may be used in other ways. For example, with respect to the implementation of process 800, real-time imagery of roads and/or public spaces may be used to target advertisements. For example, an alarm may be generated to indicate that there is a high density of vehicles on a particular road (e.g., due to a traffic jam) or a high density of people are in a particular park. In response, a self-flying blimp advertisement may be routed to the location associated with the alarm.

In one implementation, and as previously mentioned, the aerial imaging data may be used to determine traffic congestion. Traffic congestion may be analyzed based on spacing between cars, car density on the roads, speed measurements of certain vehicles (e.g., speed measurements obtained directly from telematics device 255), or based on other factors.

Although the requests for aerial images were generally discussed above as being performed by a server device, such as image processing and analysis component 230, after receiving an alert/alarm from telematics device 255 or mobile device 260, in some implementations, the telematics device or mobile device 260 may directly request the aerial image from aerial imaging device 210.

Figure 9:
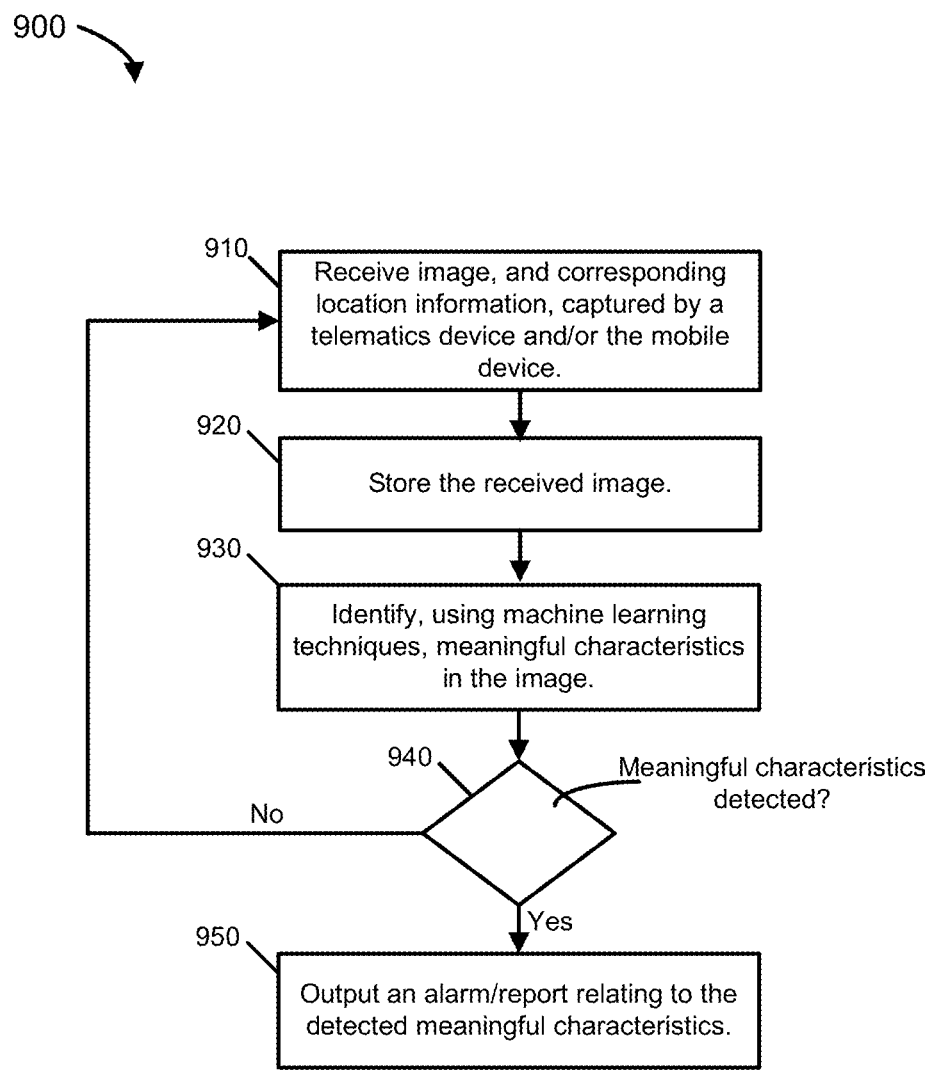
FIG. 9 is a flowchart illustrating an example process relating to the use of images from a telematics device and/or a mobile device.

FIG. 9 is a flowchart illustrating an example process 900 relating to the use of images from a telematics device and/or a mobile device. In the implementation of process 900, images captured by telematics device 255 and/or mobile device 260 may be used in conjunction with or separately from images captured by aerial imaging devices 210.

Process 900 may include receiving an image, and corresponding location information, captured by a telematics device or mobile device (block 910). The images may be taken, by telematics device 255 or mobile device 260, either automatically or in response to the detection of certain conditions or in response to a manually entered trigger. For example, telematics device 255, when it detects certain events, such as a collision or potential pothole, may automatically capture an image, such as from an in-vehicle camera, and transmit the image to image processing and analysis server 230. Process 900 may further include storing the received image (block 920).

Process 900 may include identifying, using machine learning techniques, meaningful characteristics in the received image (block 930). "Meaningful characteristics," as used herein, may refer to inferences or classifications determined from the images. Examples of meaningful characteristics generated for images from telematics device 255 could include, but are not limited to: classification of vehicle wreck severity; the number of vehicles involved in an accident; classification of overturned vehicles; the color of the vehicles involved in an accident; on which side of a road an accident occurred at in a divided highway; classification of police, fire, or ambulances at the scene of an automotive accident; classification of pedestrians involved or nearby the scene; classifications of other transportation vehicles involved with an accident (e.g. busses, tractor trailers, motorcycles, bicycles, etc.); classifications of explosions or fire, or involvement with nature (e.g. crashes with trees, fallen trees, crashes with bodies of water, sink holes, ditches, etc.). Examples of meaningful characteristics outputted for mobile device 260 could include, but are not limited to, classification of pedestrians nearby, the presence of a person, classifications of emergency vehicles responding to the person, etc.

The meaningful characteristics identified in block 930 may be identified using machine leaning techniques to determine and classify elements within the images. A simplified example of a machine learning method to classify one of the exemplary meaningful differences would be to vectorize the image pixels and define the image intensity between zero and 255 where zero is black and 255 is white, such that all the values in between define shades between white and black. The vectorized image may then by normalized and used as the input to a machine learning method such as an artificial neural network that would then classify the vectorized image (an example output would be an indication of an overturned vehicle) based on prior vectorized images of the meaningful difference (examples would be multiple images of overturned cars).

Although not explicitly shown in FIG. 9, training data for use with the machine learning techniques may include external data that is explicitly collected to train machine learning techniques, and may include classified images (e.g., images that are manually classified by a human) or mappings indicating directionality of roads based on location etc. For example, supervised or unsupervised machine learning techniques (e.g., decision tree classifiers, neural networks, regression, k-means algorithms, etc.) may be applied to generate a classification model to determine the meaningful characteristics.

When meaningful characteristics are detected (block 940—Yes), process 900 may include creates and outputting a report or alarm relating to the detected meaningful characteristics (block 950). For example, the report may include an indication of the identified meaningful characteristics, the location corresponding to the image, the time at which the image was taken, supplemental information such as sensor readings or corresponding images from aerial imaging devices 210, or other information on the meaningful differences detected, such that the information obtained can be quickly available for distribution. An example of an outputted report for a telematics device could be: "a three vehicles accident, on the westbound side of the interstate 285, the three vehicle colors are red, blue, orange, the red vehicle is in a ditch, the blue vehicle is overturned, the orange vehicle is on fire, seven pedestrians appear to be giving aid." The report may be presented to the call center agents, 911 operators, or to the emergency personal in a written, visual, or auditory manner. As another example, when the detected meaningful characteristic includes a road hazard, vehicle collision, or other condition that may be relevant to drivers approaching the location of the detected meaningful characteristic, the report may include an alert that is broadcast to nearby drivers (e.g., drivers using a particular GPS-based navigation application may be provided with an alert indicating the upcoming road hazard, etc.). This type of alert may be particularly useful for hazards that are not easily seen by vehicle drivers (e.g., an alert for a large pothole that is positioned immediately after a sharp bend in the road) or when driving conditions warrant the alert (e.g., during storm conditions or at night drivers may obtain more benefit from such alerts relative to good driving conditions in which the drivers are more likely to visually recognize the hazard).

In one implementation, the aerial imaging device taking the image may be re-aligned (e.g., re-positioned) such that the image quality fully captures a desired view (e.g. an overhead view of a vehicle accident instead of a view at an angle where the accident is blocked by trees). In this situation, the classification of process 900 (e.g., the determination of whether meaningful characteristics are detected) may further take into account the view quality. When the view quality is determined to be poor, the aerial imaging device may be repositioned based on the classification of the poor view and the goal of obtaining a better view angle. Alternatively, a different aerial imaging device may be selected to capture the image.

In another implementation, aircraft such as commercial airliners could be outfitted with image taking devices and be used to take images upon a request for an image at a particular location. Further, aircraft such as commercial airliners might deviate from pre-planned flight patterns based to obtain an image. Whether an airline deviates from a pre-planned flight pattern may be based on, for example: financial incentives for the image, whether the flight is on-time, or the amount of time lost or fuel expended by the deviation. In some situations, an airline may require approval from a regulator (Federal Aviation Administration) before deviating from a flight plan. In this situation, whether the airline can obtain approval (e.g., via an automated process) may also be taken into account.

With respect to financial incentives for the image, image processing and analysis component 230 (or another device), when requesting that an image, of a particular location, be taken by an airline, may include an indication of financial incentives for the image. The financial incentives may include, for example, a set price, a variable price based on how far the airliner needs to be rerouted, etc. In one implementation, the financial incentives may be based on an auction model in which the request for the image is broadcast to multiple airlines. The airlines (and/or operators of other aerial imaging devices 210) may bid to take the image. When deciding how much to bid or whether to take the image, the airline may take into account the factors given above relating to deviation from a pre-planned flight pattern.

Figure 10:
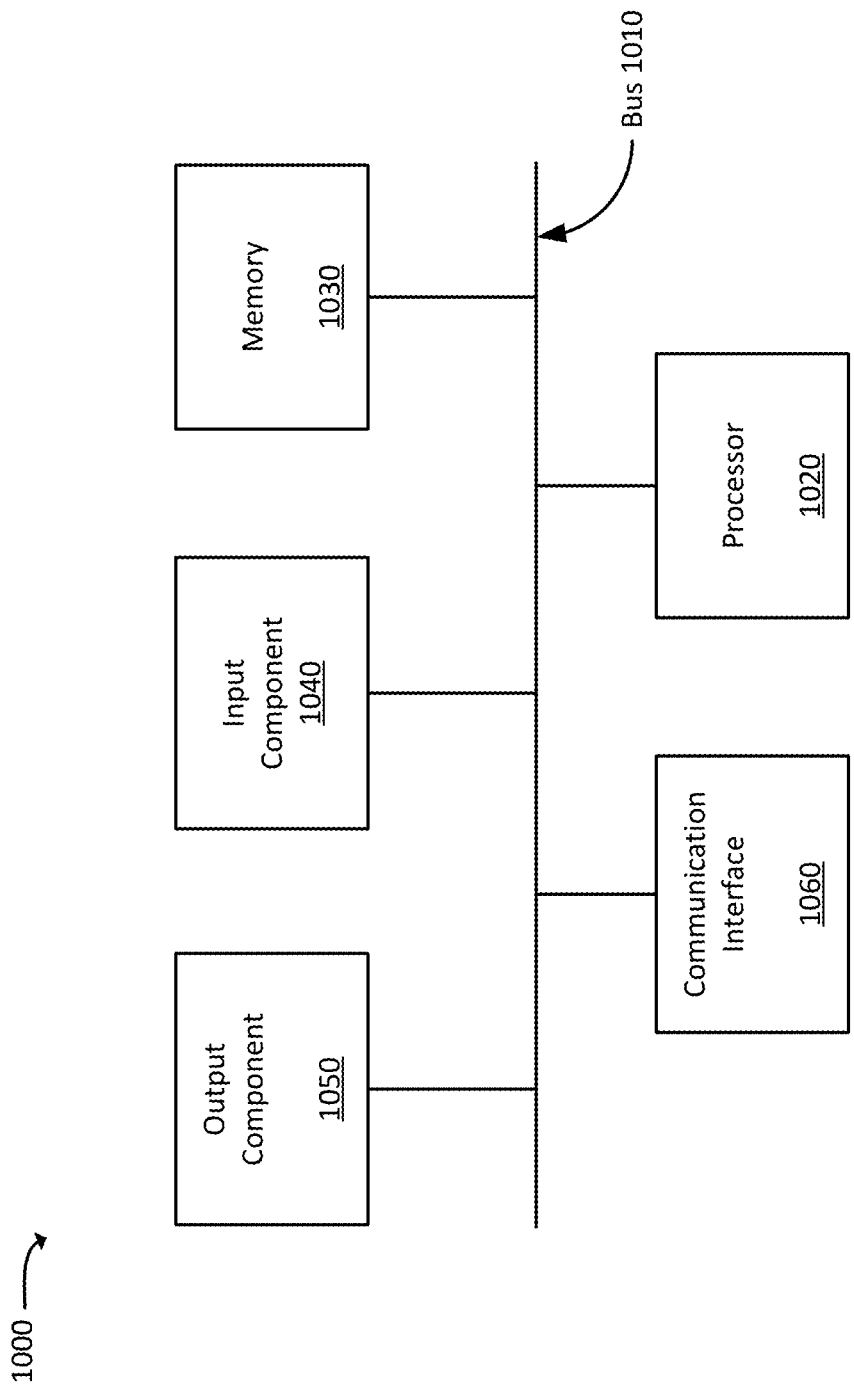
FIG. 10 is a diagram of example components of a device.

FIG. 10 is a diagram of example components of device 1000. One or more of the devices described above (e.g., with respect to FIGS. 1, 2, 5, and/or 7) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may include processing circuitry to interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4, 6, 8, and 9 the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, implemented by one or more computing devices, comprising:
    receiving, by the one or more computing devices, an alert indicating a condition or event associated with a user device, the alert identifying a location of the user device;
    identifying a particular aerial imaging device, from a plurality of aerial imaging devices, as an aerial imaging device that is capable of capturing an aerial image associated with the location of the user device;
    requesting, by the one or more computing devices and from the particular aerial imaging device, the aerial image associated with the location of the user device;
    receiving, by the one or more computing devices, the requested aerial image; and
    responding, by the one or more computing devices, to the alert based on the received image.

2. The method of claim 1, wherein the condition or event includes an emergency situation, and wherein responding to the alert further includes:
    outputting the image to an emergency call center.

3. The method of claim 1, wherein the requesting of the aerial image and the receiving of the requested aerial image are performed in real-time or near real-time relative to the receiving of the alert.

4. The method of claim 1, wherein the condition or event is automatically generated by the user device based on data received via one or more sensors associated with the user device.

5. The method of claim 4, wherein the user device includes a vehicle telematics device.

6. The method of claim 1, wherein the aerial imaging device includes a satellite or an Unmanned Aerial Vehicle (UAV).

7. The method of claim 1, wherein the user device includes a vehicle telematics device and the condition or event includes:
    a road pothole.

8. The method of claim 1, wherein the user device includes a mobile device carried by a user and the condition or event includes:
    a medical emergency condition of the user; or
    a condition or event that is manually input, into the user device, by the user.

9. A server device including:
    a non-transitory computer-readable medium containing program instructions; and
    one or more processors to execute the program instructions to:
        receive an alert indicating a condition or event associated with a user device, the alert identifying a location of the user device;
        identify a particular aerial imaging device, from a plurality of aerial imaging devices, as an aerial imaging device that is capable of capturing an aerial image associated with the location of the user device;
        request, from the particular aerial imaging device, the aerial image associated with the location of the user device;
        receive the requested aerial image; and
        respond to the alert based on the received image.

10. The server device of claim 9, wherein the condition or event includes an emergency situation, and wherein the processing circuitry is further to:
    process the alert by outputting the image to an emergency call center.

11. The server device claim 9, wherein the requesting of the aerial image and the receiving of the requested aerial image is performed in real-time or near real-time relative to the receiving of the alert.

12. The server device of claim 9, wherein the user device includes a vehicle telematics device and the condition or event includes:
    a road pothole.

13. The server device of claim 9, wherein the user device includes a mobile device carried by a user and the condition or event includes:
    a medical emergency condition of the user; or
    a condition or event that is manually input, into the user device, by the user.

14. A device comprising:
    a non-transitory computer-readable medium containing program instructions; and one or more processors to execute the program instructions to:
  receive, from a vehicle telematics device associated with a vehicle, an indication of a request for emergency assistance associated with the vehicle and a location of the vehicle;
  identify, based on the location of the vehicle, an aerial imaging device, from among a plurality of potential aerial imaging devices, capable of capturing an image of an area associated with the location;
  request, from the identified aerial imaging device, an aerial image associated with the location;
  receive the requested aerial image; and
  output the received aerial image to an emergency response entity.

15. The device of claim 14, wherein the request is generated automatically by the vehicle telematics device based on sensor data generated by the vehicle telematics device.

16. The device of claim 14, wherein the request for emergency assistance indicates a potential collision of the vehicle.

17. The device of claim 14, wherein the request for emergency assistance indicates a breakdown of the vehicle.

18. The device of claim 14, wherein the aerial imaging device includes a satellite, Unmanned Aerial Vehicles (UAV), or a blimp.

19. The method of claim 1, wherein the user device includes a vehicle telematics device and the condition or event includes an automatically detected emergency situation of the vehicle associated with the vehicle telematics device, and wherein the method further comprises:
  automatically outputting the particular aerial image to an emergency call center.

20. The server device of claim 9, wherein the user device includes a vehicle telematics device and the condition or event includes an automatically detected emergency situation of the vehicle associated with the vehicle telematics device, and wherein the one or more processors are further to execute the program instructions to:
  automatically output the particular aerial image to an emergency call center.

* * * * *